Patented Mar. 30, 1954

2,673,857

UNITED STATES PATENT OFFICE 2,673,857

PRODUCTION OF GAMMA ISOMER OF BENZENE HEXACHLORIDE

Philip F. Tryon, Terre Haute, Ind., assignor to Commercial Solvents Corporation, Terre Haute, Ind., a corporation of Maryland No Drawing. Application December 8, 1949, Serial No. 131,898

6 Claims. (Cl. 260—340.6)

My invention relates to a method for producing substantially pure gamma isomer of benzene hexachloride. More specifically, it relates to a method of producing substantially pure gamma isomer of benzene hexachloride by crystallization from a mixture of isomers of benzene hexachloride of enhanced gamma isomer content and by the decomposition of benzene hexachloride gamma isomer complexes as hereinafter disclosed.

Benzene hexachloride, which is also known as 1,2,3,4,5,6 - hexachlorocyclohexane, is ordinarily produced by reacting benzene in the liquid phase with chlorine in such a manner as to promote the addition of the chlorine to benzene. This reaction gives rise to the formation of five isomeric benzene hexachlorides known as the alpha, beta, gamma, delta and epsilon isomers, these isomers being present in the mixture in varying quantities and possessing different properties and utilities. To date the most important use of the benzene hexachlorides is as insecticides, parasiticides, etc. Unfortunately, however, only the gamma isomer is particularly effective for this purpose and, being present in the primary reaction product in amounts ranging customarily from approximately 10 to 20% of the total reaction mixture, it is for many purposes desirable to separate the gamma isomer from the remaining isomers which possess little or no utility for the above purposes. As in the case of most isomeric compounds a separation of this character presents numerous difficulties and prior to my invention no satisfactory method has been available for the separation and recovery of substantially pure gamma isomer of benzene hexachloride in a commercially feasible manner from its isomers.

In the past the gamma isomer of benzene hexachloride has been produced in several different ways. These processes, however, have been commercially unfeasible because of their cost and the character of the products produced. One of the more important of these processes is described in British Patent 586,439 by Cooke et al. and consists of dissolving the crude benzene hexachloride in a solvent in which the gamma isomer has a high solubility, and one or all the other isomers a low solubility. This produced a product containing only from 20–66% gamma isomer. Another method is reported by Slade in Chemistry and Industry, 314 (1945). Slade shows the isolation of the pure gamma isomer by treating the crude benzene hexachloride with methanol, in which the alpha and beta isomers are relatively insoluble, separating the solid product, leaving a solution of primarily gamma and delta isomers, evaporating this solution and thus obtaining a small amount of substantially pure gamma isomer. The pure gamma isomer of benzene hexachloride is then prepared by recrystallization of the substantially pure isomer from chloroform.

In carrying out my invention, I start with a mixture of isomers of benzene hexachloride containing an enhanced proportion of the gamma isomer. By enhanced proportion of the gamma isomer, I mean a mixture of the isomers of benzene hexachloride which contains more of the gamma isomer than is normally formed when benzene hexachloride is produced by the chlorination of benzene, i. e. 10–20%. This mixture of enhanced gamma isomer content can be prepared in a number of ways as for example by the method of Cooke et al. referred to above. Another and more desirable procedure for preparing the mixture of isomers of benzene hexachloride, which I use as a starting material in carrying out my invention, consists of first mixing crude benzene hexachloride with about an equal weight of carbon tetrachloride and slurrying the resulting mixture for about one and one-half hours. The slurry is then filtered and the cake washed with additional carbon tetrachloride. The combined filtrate and wash are then steam distilled to remove the carbon tetrachloride. The residue consists of a mixture of isomers of benzene hexachloride of approximately the following composition: 40–47% gamma isomer, 18–25% alpha isomer, 1–3% beta isomer, 20–25% delta isomer, and 1–3% epsilon isomer, which forms an oily, crystalline mass. This method of preparing the starting material which I use for my invention has, therefore, as will be shown hereafter, the added advantage of producing at least a 2:1 ratio of gamma to alpha isomer and thus, the starting material prepared in this way can be used with any of the solvents which are used in carrying out my invention. It should be emphasized, however, that the starting material which I use in carrying out my invention can be prepared in any manner, and is not limited to the process shown above.

In carrying out my invention, I first dissolve the oily, crystalline mixture of isomers of benzene hexachloride, containing an enhanced proportion of the gamma isomer, in a solvent in which the solubility ratio of the gamma isomer of benzene hexachloride to the alpha isomer of benzene hexachloride is 2 or less, such as for example dioxane, tetrahydropyran, tetrahydrofuran, dioxolane, and 2-methyldioxolane. After solution of the mixture of isomers in the solvent, it is crystallized. The crystals which form are a complex of the gamma isomer of benzene hexachloride and solvent when 1,4-dioxane is used and substantially pure gamma isomer of benzene hexachloride when the other above-mentioned solvents are used.

When dioxane is used as the solvent in carrying out my process, I have found that the starting material must contain the gamma isomer in at least a 3:2 ratio to the alpha isomer. As this ratio is decreased the amount of alpha isomer in the product at useful yield levels increases beyond an amount wherein the process is practical. When dioxane is used as the solvent in carrying out my process, a reaction takes place and the crystalline product formed is the complex bis-(gamma benzene hexachloride) 1,4-dioxane (theoretical chlorine 63.53%; determined 63.57%; melting point 80° C.; vapor pressure at 2° C.—2 mm.). Generally the purity of crystals can be said to be about 95–100%. Based on the original gamma isomer content in the mixture of isomers of benzene hexachloride, the yield which can be expected is in the neighborhood of 35–60%. On standing at room temperature bis-(gamma benzene hexachloride) 1,4-dioxane decomposes into the gamma isomer of benzene hexachloride and 1,4-dioxane.

The complex bis-(gamma benzene hexachloride) 1,4-dioxane decomposes at room temperature and pressure losing 1,4-dioxane, and leaving the gamma isomer of benzene hexachloride. The decomposition can be effected by spreading the crystals of bis-(gamma benzene hexachloride) 1,4-dioxane to a depth of approximately ¼ inch and allowing them to stand at room temperature for approximately 24 to 48 hours. The decomposition can be effected with more rapidity by heating the crystals and I have found that heating at approximately 50° C. for about 4 to 6 hours is sufficient to complete the decomposition.

When tetrahydropyran is used as the solvent in my invention, it is necesary to use a starting material which contains the gamma isomer in at least a 5:3 ratio to the alpha isomer. The product formed is a crystalline form of substantially pure gamma isomer of benzene hexachloride.

When tetrahydrofuran is used as the solvent in my invention, it is necessary to use a starting material which contains the gamma isomer in at least a 3:2 ratio to the alpha isomer. The product formed is a crystalline form of substantially pure gamma isomer of benzene hexachloride.

When dioxolane is used as a solvent in my invention, it is necessary to use a starting material which contains the gamma isomer in at least a 2:1 ratio to the alpha isomer. The product formed is a crystalline form of substantially pure gamma isomer of benzene hexachloride.

When 2-methyldioxolane is used as a solvent in my invention, it is necessary to use a starting material which contains the gamma isomer in at least a 3:2 ratio to the alpha isomer. The product formed is the pure gamma isomer of benzene hexachloride and in this case as in the case where tetrahydropyran, tetrahydrofuran, and dioxolane are used a complex of the gamma isomer of benzene hexachloride with the solvent is not formed.

Other than the variation of the ratio of gamma isomer to alpha isomer in the starting material when the different solvents are used and other than the fact that decomposition of a complex is necessary in order to obtain the pure gamma isomer of benzene hexachloride when 1,4-dioxane is used, the procedure for carrying out my invention is the same when any of the above named solvents are used. As already mentioned, the starting material obtained by the procedure shown above is particularly advantageous due to the fact that it contains the gamma isomer of benzene hexachloride in approximately a 2:1 ratio to alpha isomer. This ratio of gamma isomer to alpha isomer in the starting material is adequate for use with any of the solvents mentioned herein since the highest ratio necessary is the 2:1 ratio required when dioxolane is used.

The amount of solvent used to dissolve the mixture of isomers of benzene hexachloride has been found to be at least 0.2 ml. per gram of the mixture of isomers. The preferred amount has been found to be from 0.2 to 0.8 ml. per gram of the mixture of isomers. The optimum amount for a particular solvent has been found to depend on the ratio of gamma isomer to alpha isomer in the starting material. As the ratio of gamma isomer of benzene hexachloride to alpha isomer of benzene hexachloride increases, the amount of solvent to be used can be adjusted toward the lower limit of the range set out above. For a particular ratio of gamma isomer to alpha isomer in the starting material, the lower limit of the range of amounts of solvent gives some alpha isomer in the product, while the upper limit gives a lower yield.

In isolated cases, I have found that when using an equal amount of 1-butanol or methanol with the crystallization solvent, the yield is increased, but the results in general show that as a whole there is little difference in yield when alcohol is used over the use of the crystallization solvent alone.

By adjusting the temperature to from 15–25° C., crystallization of the product from the solution of the mixture of isomers is facilitated. Slightly better yields are realized by adjusting the temperature toward the lower limit of the suggested temperature range for crystallization.

The crystalline product in the final mixture can be recovered by any method as for example by centrifuging the product mixture, and washing the crystals while still in the centrifuge with butanol. The crystals are then removed from the centrifuge and dried in order to obtain the gamma isomer of benzene hexachloride.

The following examples are offered to show specific embodiments of my invention, but are not intended to limit the scope of the invention to the examples as shown. In each experiment, unless otherwise stated, the procedure used consisted of first dissolving the mixture of isomers, containing an enhanced proportion of gamma isomer, in the crystallization solvent, mixed with alcohol, if desired. The mixture of isomers contains some beta isomer, which is not specified due to the difficulty in analyzing for it. The solution was next cooled in a water bath or by other suitable means to effect crystallization, a temperature of 15–25° C. usually being sufficient. The resulting slurry was then centrifuged and, after the mother liquor had been drained off, the crystals were washed with 30 ml. of butanol. The mother liquor and wash were then discarded and the crystals removed, air dried for 24 hours and then weighed.

*Example I*

300 grams of a mixture of isomers of benzene hexachloride containing 141 grams of the gamma isomer, 60 grams of the alpha isomer, 72 grams of the delta isomer, and 5.7 grams of the epsilon isomer were dissolved in 100 ml. of dioxane (0.33 ml. of dioxane per gram of mixture of isomers).

Upon cooling to approximately 15° C. crystals formed. (Analysis: Per cent Cl, theory—63.53; found—63.57. Melting point—80° C.). The latter were centrifuged, washed, and left in air for 24 hours. 85 grams of 99% pure gamma isomer (M. P. 108°–111°) were obtained. This amounted to a 60% yield of gamma isomer on the basis of the gamma isomer content of the above mixture of isomers.

*Example II*

280 grams of a mixture of isomers of benzene hexachloride containing 123 grams of the gamma isomer, 50 grams of the alpha isomer, 78 grams of the delta isomer, and 15 grams of the epsilon isomer were dissolved in 56 ml. of dioxane (0.2 ml. of dioxane per gram of mixture of isomers). After crystallization, washing, and leaving in air, 83 grams of a product consisting of 83% gamma isomer (M. P. 101°–108°) was obtained. This amounted to a yield of 56% on the basis of the gamma isomer content of the above mixture of isomers.

*Example III*

280 grams of a mixture of isomers of benzene hexachloride containing 126 grams of the gamma isomer, 58 grams of the alpha isomer, 78 grams of the delta isomer, and 8.4 grams of the epsilon isomer were dissolved in 112 ml of dioxane (0.4 ml. of dioxane per gram of mixture of isomers). After crystallization, washing, and leaving in air, 68 grams of a product consisting of 98% gamma isomer (M. P. 110°–113°) was obtained. This amounted to a yield of 53% on the basis of the gamma isomer content of the above mixture of isomers.

*Example IV*

280 grams of a mixture of isomers of benzene hexachloride containing 123 grams of gamma isomer, 50 grams of alpha isomer, 78 grams of the delta isomer, and 15 grams of the epsilon isomer were dissolved in 224 ml. of dioxane (0.8 ml. of dioxane per gram of mixture of isomers). After crystallization, washing, and leaving in air, 48 grams of a product consisting of 95% gamma isomer (M. P. 111°–114°) was obtained. This amounted to a yield of 37% on the basis of the gamma isomer content of the above-mentioned mixture of isomers.

*Example V*

300 grams of a mixture of isomers of benzene hexachloride containing 141 grams of the gamma isomer, 60 grams of the alpha isomer, 78 grams of the delta isomer, and 5.1 grams of the epsilon isomer were dissolved in 100 ml of tetrahydrofuran (0.33 ml. of tetrahydrofuran per gram of mixture of isomers). After crystallization and drying 30 grams of a product consisting of 99% gamma isomer (M. P. 112°–114°) was obtained. This amounted to a yield of 21% on the basis of the gamma isomer content of the above mixture of isomers.

*Example VI*

300 grams of a mixture of isomers of benzene hexachloride containing 141 grams of the gamma isomer, 60 grams of the alpha isomer, 78 grams of the delta isomer, and 5.1 grams of the epsilon isomer were dissolved in 100 ml. of tetrahydropyran (0.33 ml. of tetrahydropyran per gram of mixture of isomers). After crystallization and drying, 51 grams of a product consisting of 99% gamma isomer (M. P. 111°–114°) was obtained. This amounted to a yield of 36% on the basis of the gamma isomer content of the above mixture of isomers.

*Example VII*

300 grams of a mixture of isomers of benzene hexachloride containing 141 grams of the gamma isomer, 60 grams of the alpha isomer, 78 grams of the delta isomer, and 5.1 grams of the epsilon isomer were dissolved in 100 ml. of dioxolane (0.33 ml. of dioxolane per gram of the mixture of isomers). After crystallization and drying, a product consisting of 97% gamma isomer (M. P. 110°–113°) was obtained.

*Example VIII*

300 grams of a mixture of isomers of benzene hexachloride containing 141 grams of the gamma isomer and 60 grams of the alpha isomer were dissolved in 100 ml. of 2-methyldioxolane (0.33 ml. of 2-methyldioxolane per gram of the mixture of isomers). After crystallization and drying, 83 grams of a product consisting of 90% gamma isomer (M. P. 104°–106°) was obtained. This amounted to a yield of 53% on the basis of the gamma isomer content of the above mixture of isomers.

While the foregoing examples illustrate embodiments of my invention, it is to be understood that departure may be made therefrom within the scope of the specification and claims. In general, it may be said that any modification or equivalents that would ordinarily occur to those skilled in the art are to be considered as lying within the scope of my invention.

In accordance with the foregoing specification, I claim as my invention:

1. In a process for obtaining substantially pure gamma isomer of benzene hexachloride, the steps which comprise dissolving in 1,4-dioxane a mixture of benzene hexachloride isomers containing the gamma isomer in a greater than two to one ratio to the alpha isomer, cooling said resulting solution to effect crystallization of bis-(gamma benzene hexachloride) 1,4-dioxane, recovering said bis-(gamma benzene hexachloride) 1,4-dioxane and warming to effect its decomposition to the substantially pure gamma isomer of benzene hexachloride and 1,4-dioxane.

2. In a process for obtaining substantially pure gamma isomer of benzene hexachloride, the steps which comprise dissolving a mixture of benzene hexachloride isomers containing the gamma isomer in a greater than three to two ratio to the alpha isomer in at least 0.2 ml. of 1,4-dioxane per gram of mixture of benzene hexachloride isomers, adjusting the temperature of the resulting solution to 15 to 25° C. and thereby crystallizing out of the solution bis-(gamma benzene hexachloride) 1,4-dioxane, recovering said bis-(gamma benzene hexachloride) 1,4-dioxane and warming to from about 20° C. to about 50° C. to effect the decomposition of said bis-(gamma benzene hexachloride) 1,4-dioxane into the substantially pure gamma isomer of benzene hexachloride and 1,4-dioxane.

3. In a process for the production of substantially pure gamma isomer of benzene hexachloride, the steps which comprise dissolving a mixture of benzene hexachloride isomers containing the gamma isomer in a greater than three to two ratio to the alpha isomer in 1,4-dioxane to produce bis-(gamma benzene hexachloride) 1,4-dioxane and crystallizing from the said solution the bis-(gamma benzene hexachloride) 1,4-dioxane.

4. In a process for the production of bis-(gamma benzene hexachloride) 1,4-dioxane, the steps which comprise dissolving a mixture of benzene hexachloride isomers containing the gamma isomer in at least a three to two ratio of gamma isomer to alpha isomer in at least 0.2 ml. of 1,4-dioxane per gram of said mixture of benzene hexachloride isomers to produce bis-(gamma benzene hexachloride) 1,4-dioxane and crystallizing from said solution bis-(gamma benzene hexachloride) 1,4 dioxane.

5. As a new composition of matter, the crystalline complex bis-(gamma benzene hexachloride) 1,4-dioxane.

6. In a process for the production of substantially pure gamma isomer of benzene hexachloride, the step which comprises subjecting substantially pure bis-(gamma benzene hexachloride) 1,4-dioxane to temperature conditions causing decomposition thereof.

PHILIP F. TRYON.

References Cited in the file of this patent

FOREIGN PATENTS

| Number | Country | Date |
|--------|---------|------|
| 471,941 | Belgium | Apr. 1947 |

OTHER REFERENCES

Slade: "Chemistry and Industry," October 13, 1945, pp. 315–6.